Sept. 17, 1957  B. E. BROWN ET AL  2,806,666
PILOT SEAT AND ESCAPE MEANS
Filed June 12, 1951  3 Sheets-Sheet 1

Boyd E. Brown &
Lomis Slaughter, Jr.
INVENTORS

BY *James M. Clark*

THEIR PATENT ATTORNEY.

Sept. 17, 1957  B. E. BROWN ET AL  2,806,666
PILOT SEAT AND ESCAPE MEANS
Filed June 12, 1951  3 Sheets-Sheet 3

Boyd E. Brown &
Lomis Slaughter, Jr.
INVENTORS

BY *James L. Clark*

THEIR PATENT ATTORNEY.

United States Patent Office 2,806,666
Patented Sept. 17, 1957

2,806,666

PILOT SEAT AND ESCAPE MEANS

Boyd E. Brown, Hubbard, Oreg., and Lomis Slaughter, Jr., Houston, Tex., assignors to Boeing Airplane Company, a corporation of Delaware Application June 12, 1951, Serial No. 231,178

18 Claims. (Cl. 244—140)

The present invention relates generally to accommodations for the occupants of aircraft and like vehicles and more particularly to improved devices for facilitating the escape of occupants from high speed aircraft during flight.

Numerous problems are presented in the escape of the occupants from disabled jet propelled and other high speed aircraft during flight and these problems are appreciably aggravated by the extremely high speeds and pressure effects of the airflow into which the occupant must be ejected in the course of his escape from the aircraft. In asmuch as the element of time is also a very important factor in his safe egress from such aircraft it has been proposed to jettison the canopies, seats and other portions of the aircraft by explosive or spring devices, as well as to catapult the pilot, together with his seat and parachute pack, through an opening such that the pilot and his accompanying equipment is ejected clear of the aircraft without the possibility of being struck by the tail surfaces or fouled by other parts of the aircraft.

The present invention relates generally to escape devices of this character and more particularly to an arrangement in which a pilot seat is provided in the shape of a hollow part-sphere and an accompanying part-spherical cover which is also adapted to serve as a protective enclosure for the pilot when bailing out of the aircraft at sufficiently high altitude and under high speed conditions. The hollow spherical enclosure is preferably formed of two part-spherical overlapping portions pivoted together to facilitate rapid closing in a telescoping manner and for rapid separation of the part-spherical portions while the spherical or ball-shaped enclosure is falling free during flight. During normal flight the pilot is enabled to be seated in the inner shell portion with his back supported by a readily deflatable pneumatic cushion, in which seated condition the outer shell portion is positioned back into a nested or retracted position. When utilizing the device for escape purposes the pilot deflates the back cushion, moves back into the inner shell portion and pulls the outer shell portion into place to form the complete spherical enclosure. As the outer shell of the ball is swung forward to the closed position, automatic mechanism releases and jettisons the floor which normally supports the open ball, and the ball, swinging about an open hinge, falls free of the airplane through the floor opening, being directed in its fall by fins fixed to the outer shell portion such that the pilot's back is directed into the airstream. After the ball has dropped free to a safe altitude the pilot may release the pins holding the two shell portions together and may escape therefrom by the use of his parachute in the conventional manner.

It is accordingly a primary object of the present invention to provide improved escape facilities for the occupants of high speed aircraft and similar vehicles. It is a further object to provide an improved combined seat and escape compartment which is capable of safe and comfortable use by the pilot during normal flight and for emergency escape from the aircraft when disabled during flight. It is a further object of this invention to provide a seat for an occupant of an aircraft, which seat is provided within a part-spherical shell having a back supporting cushion and an articulated outer shell for converting the seat shell into an escape ball. A further object resides in the provision of improved automatic mechanism whereby completion of the conversion of the shell portions into the completed escape ball automatically releases an escape hatch which normally supports the ball in its flight position.

It is a still further object of the present invention to provide an improved articulated escape sphere which can be readily and rapidly closed for automatic dropping through an opening or hatch in the aircraft floor or bottom wall with the shape of the escape enclosure such that it offers a minimum resistance to the airstream for falling away from the aircraft rapidly and obviating the possibility of its fouling the tail structure or other parts of the aircraft. It is a corollary objective to provide fins upon the escape enclosure which automatically direct the ball into the direction of the maximum airflow both immediately upon jettisoning and subsequently while falling freely through the air such that the pilot's back is directed into the maximum airflow for the provision of greater protection and to facilitate his escape from the separated ball portions. Further objects of the present invention reside in the improved details of the respective parts of the device, as well as in their novel inter-relationship and cooperation.

Further objects and advantages of the present invention will occur to those skilled in the art after reading the following description taken in conjunction with the accompanying drawings, forming a part hereof, in which:

Fig. 5 is a cross-sectional elevation of the fuselage looking aft as taken along the lines 5—5 of Fig. 1;

Fig. 6 is an enlarged fragmentary detailed view of the open ball portions;

Fig. 7 is a plan view of the fuselage showing the ball in the closed condition indicated in the elevation in Fig. 2; and Fig. 8 is an enlarged detail view of the automatic mechanism whereby the hatch door is released as the ball portions are closed.

Figure 1:
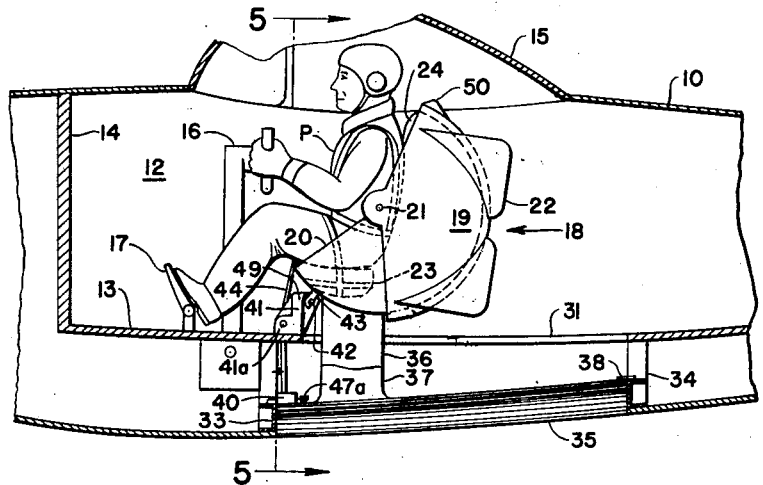
Fig. 1 is a sectional elevational view taken transversely of a portion of an aircraft fuselage within which the present improved escape arrangement has been applied.

Referring now to Figs. 1 to 5, inclusive, the numeral 10 represents the fuselage of a high speed aircraft which may preferably be supported upon the sustaining surfaces or wings 11, as shown in Fig. 5. A cockpit 12 is provided within the fuselage for the accommodation of the pilot P, the cockpit being defined by the floor 13, a front wall 14 upon which the instrument panel and instruments may be supported, and by the streamlined transparent canopy 15. A suitable rear wall (not shown) is also preferably provided and all of these walls and the joints around the openings therein may preferably be made air-tight to permit pressurization of the cockpit 12 for the comfort and convenience of the pilot during high altitude flight. It will be understood that the aircraft is also provided with a suitable power plant and control surfaces, and suitable pilot-operated controls such as the control column 16 and the rudder pedals 17 are provided for the control of the aircraft during flight.

The improved spherical enclosure is indicated generally by the numeral 18, being comprised of the outer part-spherical portion 19 and the inner part-spherical portion 20, which portions are articulated by the horizontal transverse pivots 21 disposed on an axis passing through the center of the sphere and about which the spherical portions may be rotated. The outer part-spherical portion 19 is preferably somewhat less than a half sphere or a semi-spherical portion, and the inner portion 20 is preferably greater than a semi-spherical portion such that when closed, or fully rotated from its nested or telescoped position to the closed position shown in Fig. 2, the sections continue to overlap to a sufficient extent to complete the sphere or ball and to protect the interior from air blasts and possibly objects which may strike the shell portions 19 and 20. The outer shell portion 19 is provided with a set of guide fins 22 which cause the shell portion 20 to head into the airstream, or into the direction in which the ball is falling after the fashion of the fins on a bomb and similar dropped objects. The pilot's parachute seat-pack is indicated at 23 upon which he is seated during normal operation of the aircraft, and an inflatble backrest or cushion 24 is disposed across the inner shell portion 20 for the support of the back of the pilot P during flight.

As shown in detail in Fig. 6 looking aft, as well as the sectional view in Fig. 5, a cushion deflating valve 25 is provided for the rapid deflation of the pneumatic backrest cushion 24 and a plurality of closure handles 26 are provided on the inside of the outer shell portion 19 to assist the pilot in pulling the outer portion 19 into its closed position. In the flight position shown in Fig. 1, the pilot sits within the inner shell 20 which serves as a bucket seat, with the outer shell of lesser area nested about the inner shell. As also shown in Figs. 5 and 6, a pull-ring 27 attached to the cables 28 guided within the cable sheaths 29, extends over the sheaves 30, being attached to the rounded releasable hinge pins 21 at each side of the ball in such manner that pull by the pilot upon the ring 27 causes simultaneous retraction of both pins 21, following which the shell portions readily separate from each other or may be separated by the pilot pushing outwardly with his feet against the inside of the outer portion 19.

Figure 3:
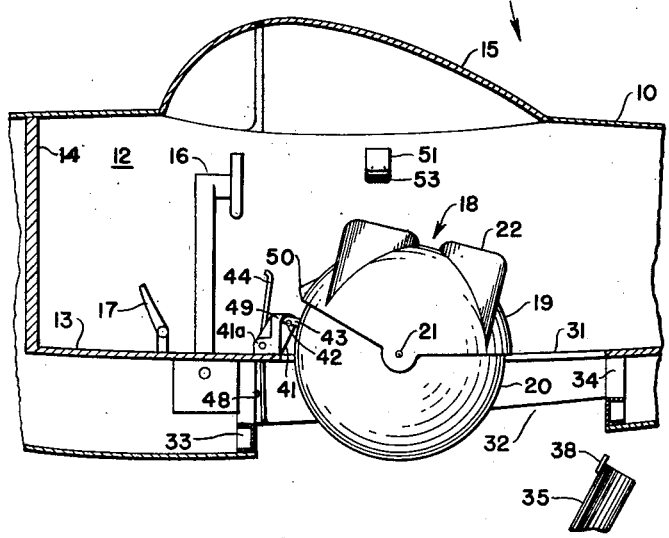
Fig. 3 is a similar view of the same after the hatch door has been jettisoned and the ball is about to fall freely through the hatch opening.
Figure 4:
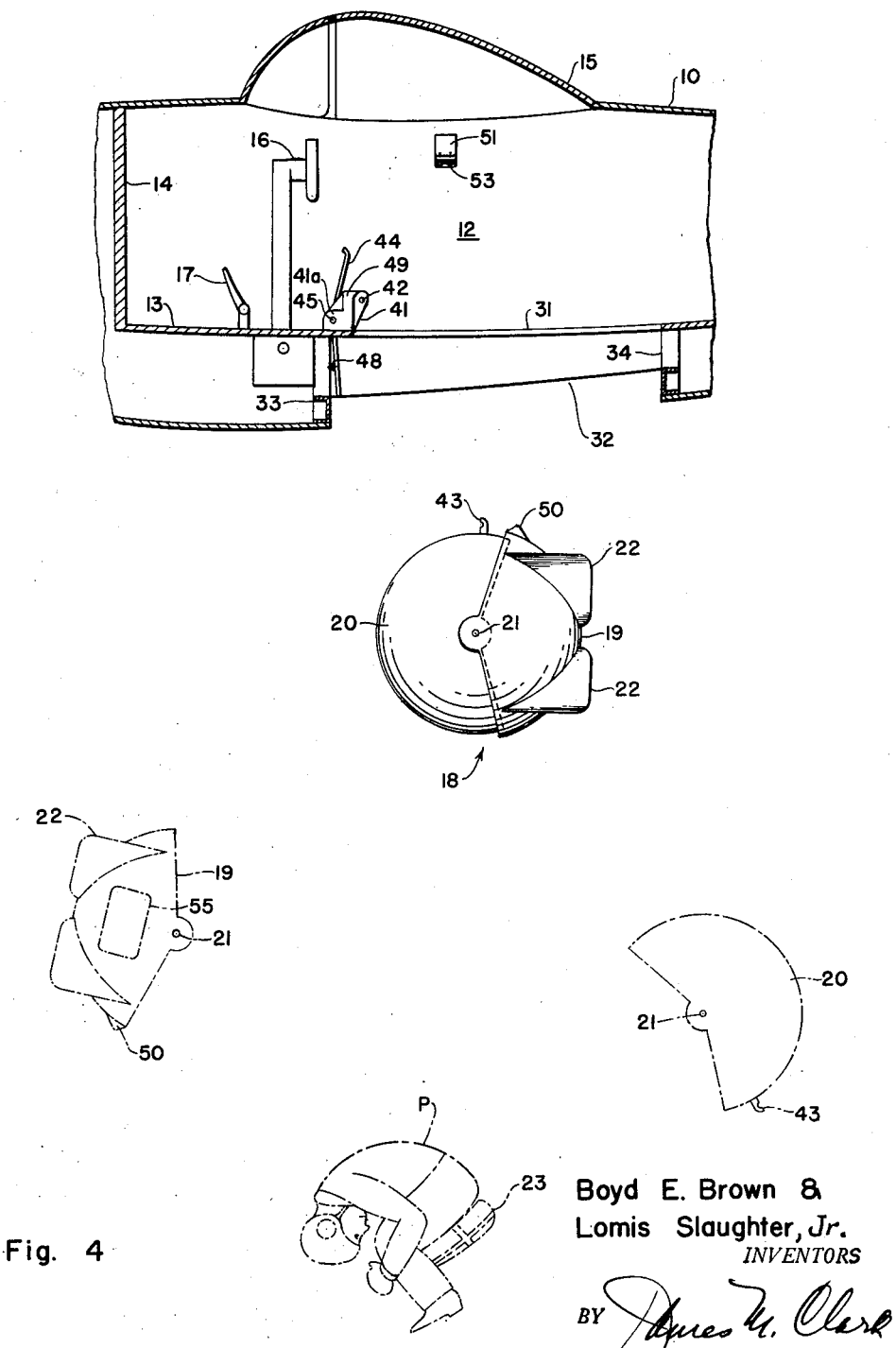
Fig. 4 is a similar view of the ball after it has been dropped free of the aircraft, as well as showing the ball portions separated and the pilot dropping freely therefrom.

The floor 13 of the cockpit is provided with an opening 31 and directly beneath this opening the bottom or belly wall of the fuselage 10 is provided with an opening 32 (see Figs. 3 and 4). The latter opening is suitably framed by the former ring 33 at the front of the hatch, and by the former ring 34 at the rear of the hatch. A suitably shaped hatch closure or door 35 is fitted within the opening 32 and has on its inner or upper side a pair of laterally spaced upstanding plate or pedestal members 36 and 37 which are suitably contoured at their top edges to support the inner shell 20 of the escape ball 18. The door 35 is also provided with a plurality of door supporting lugs 38 at its aft margin and it is provided at its forward margin with a pair of closure latches 39 and 40 which are normally spring-pressed into forward positions at which the front edge of the closure 35 is supported upon the former ring 33.

Supported upon the floor 13 and extending into the opening 31 is a lug retainer and support assembly 41 formed of the bifurcated portions 41a and carrying a laterally extending transverse pin 41, as shown in detail in Fig. 8. A pair of open notched tongues 43 are attached to or formed upon the inner shell 20 and cooperate with the keeper portion 49 of the support assembly 41 in such manner that the ball assembly 18 is required to be rotated downwardly and rearwardly about the transverse horizontal axis of the pin 42 in order for the tongue 43 to be freed from both the pin and the adjacent keeper portion 49. In other words as viewed in Fig. 8, the ball 18 could not be lifted upwardly and rearwardly inasmuch as the clearance above and forward of the tongues 43 in a direction of the retainer 49 is such that the tongues could not be withdrawn past the notched portion embracing the pin 42. Similarly as the ball is placed in position it is necessary that it be lifted up from the rear and rotated in the counterclockwise direction in order to permit the tongues 43 to be retained about the pin 42 and between the pin and the keeper portion 49.

A tripping lever 44 extends through an opening in the floor 13 between the bifurcated portions 41a, being pivotally supported therefrom by the transverse pivot 45. Adjacent the lower terminal of the lever 44 there is disposed a cable connector fitting 46, having a forwardly facing recess 46a, the fitting 46 being attached to the transverse cable 47 extending around the sheaves 47a and terminating in the abovementioned door release latches 39 and 40. A tension spring 48 is connected from the forward wall of the escape hatch 32 to the trip lever 44 and continually urges the lower portion of the lever into its forward position in which the latches 39 and 40 remain engaged. At the leading edge of the shell portion 19 there is disposed a release cam 50 which is adapted to engage the curved upper portion of the trip lever 44 as the ball is closed for the deflection of the upper portion of the lever forwardly, and its lower portion rearwardly, for the release of the cable connected latches 39 and 40 and the jettisoning of the hatch closure 35. As more particularly shown in Figs. 3 and 5, the upper portion of the ball is braced and guided in its operative or flight position by the chocks 51 and 52 carrying the pivotally mounted guide rollers 53 and 54. These sway brace chocking devices serve to prevent the ball from rolling over laterally or moving toward the top of the removable cockpit enclosure or canopy during maneuvers of the aircraft. Transparent windows such as 55 (see Fig. 4) may be provided in the outer shell 19 through which the pilot may observe what is occurring to the ball and objects about it.

The operation of the improved escape device is as follows: Let us assume that the pilot P is flying the aircraft in the normal position as shown in Fig. 1 in which he is seated upon the parachute pack 23 as his back is supported by the pneumatic backrest cushion 24. Should an emergncy condition arise in which it is necessary that the pilot evacuate the aircraft, after setting his areodynamic and power plant controls for any desired continued attitude of flight, he initially presses the button 25 which deflates the pneumatic backrest cushion 24 and permits the pilot to draw himself up in a curled-up attitude with his back against the rounded interior of the inner shell 20. As he draws himself back into the shell portion, he grasps the handles 26 with each hand and draws the shell portion 19 forwardly and downwardly about the former opening in the shell portion 20. It will be noted that the lower portion of the tripping lever 44 is not attached to the cable fitting 46 but merely slidingly engages the latter such that as the cable actuated latch releasing gear 46—47, 47a and the latches 39 and 40 are carried away from the hatch closure 35, the lever 44 remains within the aircraft.

Figure 2:
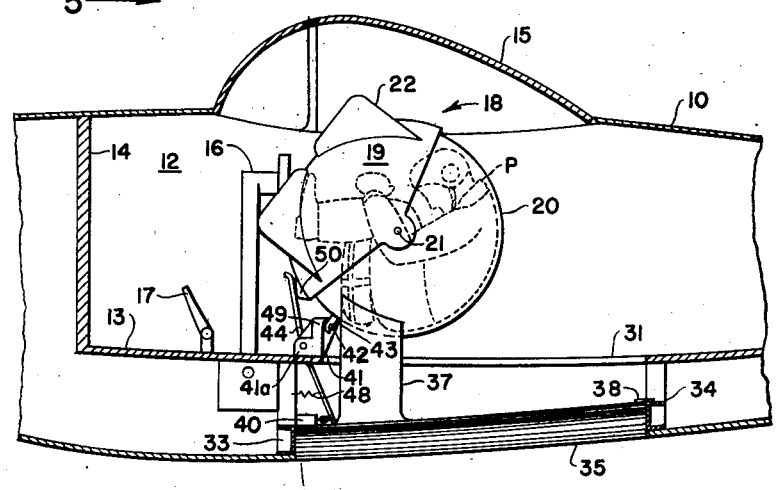
Fig. 2 is a similar view of the same with the escape ball in its closed condition about to fall free, with the hatch door, from the aircraft.

As the outer shell portion 19 completes its closing, or completion of the ball, the release cam portion 50 strikes the rounded upper terminal of the tripping lever 44 and deflects the same forwardly about the pivot 45. As the lower portion of the lever is simultaneously moved rearwardly against the opposition of the tension spring 48, the lower portion of the lever, being disposed within the recess in the cable fitting 46, pushes the fitting rearwardly to tension the cable 47 and draw the latch bolts 39 and 40 rearwardly, thereby letting the leading edge of the hatch closure 35 drop into the airstream. Up to this dropping of the leading edge of the hatch closure 35 the ball 19—20 remains supported upon the pedestals 36 and 37, despite the rearward shift in the center of gravity of the ball caused by the pilot's weight being disposed in the lower aft portion of the ball, due to the retaining effect of the portion 49 upon the notched tongues 43 engaging the pin 42. As the airstream catches the leading portion of the hatch closure 35, however, the hatch closure is rapidly pulled away from the belly of the fuselage and as it falls clear of the aircraft the pedestals 36 and 37 fall with it to permit the ball to drop and rotate downwardly and rearwardly in a clockwise direction about the transverse axis of the pin 42. Fig. 2 shows the position of the ball as the latches 39 and 40 have been retracted and the hatch closure 35 is about to fall away due to the weight of the ball and the pilot carried upon the pedestals 36 and 37. When the ball 19—20 has rotated slightly beyond the position shown in Fig. 3, the notches in the tongues 43 slip off the transverse pin 42 being no longer retained by the portion 49 and the ball is free to drop into the airstream with the vanes 22 disposed on the trailing side.

As the ball 18 falls clear of the escape opening 32 it is not drawn aft as rapidly as the closure 35 but drops clear due to its rounded shape and the lesser resistance which it addresses to the airstream. The transparent window 55 as shown in Fig. 4 is preferably provided in the outer shell portion 19 in a position in which the pilot may look through the same and when he determines that he has dropped a sufficient distance and is ready to bail out of the escape ball 18 he pulls upon the release ring 27 and the cables 28 which retract the rounded pins 21 upon which the shell portions are hinged and the portions are then free to separate or fall apart for the free fall of the pilot. The pilot may thereupon pull his rip cord for the operation of the attached parachute in the customary manner which it is not considered necessary to describe here in further detail.

The ball portions 19 and 20 are preferably installed in the airplane by insertion upwardly through the hatch opening 32. Suitable means may be provided for temporarily holding the ball in the operative flight position or it may preferably be held in place manually through the cockpit opening when the canopy 15 is removed and until the hatch door 35 and its ball-supporting elements 36 and 37 can be latched into place. A safety lock may also be provided to insure against inadvertent and undesired tripping of the lever 44. The pilot preferably climbs into and out of the cockpit in the conventional manner through the cockpit opening provided by the opened canopy 15 at such times when the aircraft is at rest upon the ground. While the escape ball is intended primarily for the escape from the aircraft while in flight at sufficiently high altitudes to permit use of a parachute, it may also be used as a protection for the pilot or other occupant of the aircraft at low altitudes just prior to or during a forced or crash landing under conditions in which it appears that the occupant may require its protection, in which case, of course, the parachute would not be used.

In certain installations it may be desirable to provide cable-actuated releasing gear at more than the front edge of the escape hatch closure 35 and it may also be desirable to forcibly eject the closure 35 by the use of compression springs, explosive means or other devices. It will also be understood that limit stops will be provided to limit the rotation of the outer shell portion 19 as it is closed about the inner portion 20 to prevent its re-opening again above the pilot's head and also that means may be provided to assist the pilot in separating the shell portions when he desires to free himself from the ball.

Other forms and modifications of the present invention which will occur to those skilled in the art after reading the above description, are intended to come within the scope and spirit of the present invention as more particularly set forth in the appended claims.

We claim:

1. In an emergency escape device for an aircraft a part-spherical shell element releasably supported within the aircraft, the interior of said shell element provided with a pneumatic cushion for the support of an occupant, means for deflating said pneumatic cushion in an emergency, a closure movably mounted upon said shell element for completing the spherical outline thereof as an emergency escape enclosure envelope about said occupant and means initiated by the closing movement of said closure for the release of said enclosure and its occupant from the aircraft.

2. In an aircraft, an emergency escape ball installation comprising a part-spherical shell portion, an escape hatch supporting said part-spherical portion, releasable latches supporting said escape hatch within the aircraft, a second part-spherical portion movably mounted upon said first shell portion arranged to be moved from a nested position with respect to said first shell portion to a position in which it encloses the pilot's body and completes the spherical enclosure thereabout, and release means cooperatively carried by the aircraft and said escape hatch automatically initiated by completion of said enclosure to trip said latches for the jettisoning of said escape hatch, said escape ball and the occupant therein.

3. An aircraft occupant escape means comprising a first hollow shell portion releasably supported upon the aircraft, a second hollow shell portion pivotally mounted upon said first shell portion arranged for rotation about said pivot from an open nested position in which the occupant may be seated within said first shell portion into a closed position in which it forms a completely enclosed escape compartment for said occupant and means initiated by movement of said second shell portion for the release of said escape compartment from the aircraft.

4. In an occupant means for aircraft, a hollow inner shell portion, a closure releasably supported upon the aircraft for the support of said inner shell portion, a hollow outer shell portion pivotally mounted upon said inner shell portion arranged for rotation about said pivot into a position in which it forms a completed escape compartment for said occupant and means operatively connected to said releasably supported closure actuated by rotation of said outer shell portion for releasing said closure and said escape compartment from the aircraft.

5. In an escape device for aircraft, a shell portion arranged to be occupied by an occupant seated within its interior, said shell portion releasably supported upon an aircraft, a cover portion for said shell portion pivotally mounted thereon arranged to be rotated to a closing position in which said occupant is completely protected within said shell portion and said cover portion, means operably associated with said shell portion initiated by rotation of said cover portion to said closing position for the automatic release of both said portions from the aircraft and manual means operable from within said shell portion for the separation of said portions by releasing the pivotal mounting between said portions.

6. In aircraft, an escape device comprising a shell member arranged to provide a seat for an occupant, releasable means for the support of said shell member from the aircraft, a cover for said shell member pivotally mounted on said shell member arranged to be rotated to a closing position in which said occupant is completely enclosed within an escape device complementarily formed by said shell member and said cover, and means cooperatively associated with said shell member, said cover and the aircraft initiated by rotation of said cover for releasing said escape device from the aircraft by the actuation of said releasable support means.

7. In an aircraft, an occupant escape means comprising a shell element releasably supported upon the aircraft, a second shell element movably mounted upon said first shell element arranged upon closing movement to provide a closure therefor, and means operatively associated with the first and second said shell elements and the aircraft initiated by the closing movement of said second shell element with respect to said first shell element for automatically releasing both said shell elements from the aircraft.

8. In an aircraft having a control column and rudder pedals, an occupant escape means comprising a hollow shell element releasably supported upon the aircraft, a second hollow shell element pivotally mounted upon said first shell element and pivotally movable with respect thereto to provide a closure therefor, means disposed within said first shell element to provide a bucket seat for said occupant from which to operate said control column and said rudder pedals, and trip means initiated by the closing movement of said second shell element with respect to said first shell element upon rotation about said pivotal mounting for automatically releasing said resulting shell element escape means from the aircraft.

9. In an aircraft, an occupant escape means comprising a shell element releasably supported upon the aircraft, a second shell element pivotally mounted upon said first shell element, cushion means carried within said first shell element to provide a seat and backrest for said occupant during flight of the aircraft, means carried internally within said second shell element for manually rotating the same for closing movement about said pivotal mounting into a complementarily closing position with respect to said first shell element, and tripping means initiated by said closing movement of said second shell element upon rotation about said pivotal mounting for automatically releasing said resulting shell elements from the aircraft.

10. In an aircraft, an emergency escape device including a shell element releasably supported within the aircraft, the interior of said shell element provided with a pneumatic cushion for the support of an occupant, means for deflating said pneumatic cushion in an emergency, a closure movably mounted upon said shell element for completing the shell outline thereof as an escape enclosure envelope about said occupant, and releasing mechanism arranged upon movement of said closure with respect to said shell element to automatically release said shell element from its support within the aircraft.

11. In an aircraft, a member, releasable means for the support of said member upon the aircraft, a closure element pivotally mounted upon said member for movement between a normally opened position with respect to said member and a closed position in which it supplements said member to provide a fully enclosed escape enclosure for an occupant of the aircraft, releasable pivot means providing the pivotal mounting of said closure element upon said member and means carried by said closure element arranged upon completion of the closing movement of said closure element with respect to said member to release said releasable support means for the release of said completed escape enclosure for its free fall from the aircraft and manual actuation of said releasable pivot means initiates separation of said closure element from said member for the escape of an occupant from said enclosure during its free fall from the aircraft.

12. In an aircraft, a seat member of substantially cup shape, releasable means for the support of said seat member upon the aircraft, a closure element pivotally mounted upon said seat member for manual movement between a normally opened position with respect to said seat member and a closed position in which it complementarily completes said seat member shape to provide a fully enclosed escape enclosure for an occupant of the aircraft, guide fins carried by said closure element, pivot means mounting said closure element upon said seat member whereby manual closing movement of said closure element with respect to said seat member causes tripping of said releasable support means for the automatic release of said completed escape enclosure for its free fall from the aircraft in which said guide fins direct said seat member toward the direction of free fall of said escape enclosure and manual actuation of said pivot means initiates separation of said closure element from said seat member for the escape of an occupant from said enclosure during its free fall from the aircraft.

13. In an aircraft escape arrangement, a cup-shaped seat member having a pneumatic inflated cushion arranged to provide a bucket type seat for an occupant, said seat member and inflated cushion arranged in such manner that when occupied only a small portion of the body of an occupant is contained within said cup-shaped seat member, releasable means for the support of said seat member upon the aircraft, a closure element pivotally mounted upon said seat member for manual movement between a normally opened position with respect to said seat member and a closed position in which it supplements said seat member to provide a fully enclosed escape enclosure for an occupant of the aircraft, means for deflating said pneumatic cushion, releasable pivot means mounting said closure element upon said seat member whereby deflation of said pneumatic cushion permits an occupant to fall back into said cup-shaped seat member such that substantially the entire body of the occupant is contained within said cup-shaped member and completion of the closing movement of said closure element with respect to said seat member provides a completed escape enclosure around the body of said occupant.

14. In an aircraft escape arrangement, an articulated escape closure including a seat shell element and a closure shell element, a releasable portion of the aircraft including an offset support surface for said seat shell element disposed beneath said seat shell element and forward of its center of gravity only, means including a detent cooperatively associated with the aircraft and a forward portion of said seat shell element for preventing rearward rocking of said seat shell element about said offset support surface, further means including a member engageable by said closure shell element upon closing of said enclosure for the release of said releasable aircraft portion and its offset support surface from its offset position beneath said seat shell element for imparting rearward and downward rotation to said seat shell element and its separation from said detent means and its release from the aircraft.

15. In an aircraft emergency escape arrangement, an articulated escape enclosure including a seat shell element having an opening and a closure shell element, a jettisonable portion of the aircraft arranged to provide an offset contacting support surface for said seat shell element forward of its center of gravity only, said seat shell element opening normally facing upwardly and forwardly, open hinge means cooperatively associated with the aircraft and a forward portion of said seat shell element for preventing rearward rotation of said seat shell element about its contacting support surface, manual means for closing said seat shell element opening with said closure shell element, further means for the release of said jettisonable aircraft portion from beneath said seat shell element for imparting rearward and downward rotation to said seat shell element and its separation from said open hinge means due to said offset support to a released position of said escape enclosure in which said seat shell element opening having been closed by said closure element and faces rearwardly and upwardly.

16. In aircraft, a pilot escape device including an inner rounded shell portion opening forwardly with respect to the aircraft arranged to be occupied by a pilot seated within the interior of said shell portion, a rounded cover for said inner shell portion pivotally mounted upon said inner shell portion on a horizontal transverse axis, a support for said inner shell portion carried by the aircraft, said cover arranged to be initially rotated manually upball 19—20 remains supported upon the pedestals 36 and 37, despite the rearward shift in the center of gravity of the ball caused by the pilot's weight being disposed in the lower aft portion of the ball, due to the retaining effect of the portion 49 upon the notched tongues 43 engaging the pin 42. As the airstream catches the leading portion of the hatch closure 35, however, the hatch closure is rapidly pulled away from the belly of the fuselage and as it falls clear of the aircraft the pedestals 36 and 37 fall with it to permit the ball to drop and rotate downwardly and rearwardly in a clockwise direction about the transverse axis of the pin 42. Fig. 2 shows the position of the ball as the latches 39 and 40 have been retracted and the hatch closure 35 is about to fall away due to the weight of the ball and the pilot carried upon the pedestals 36 and 37. When the ball 19—20 has rotated slightly beyond the position shown in Fig. 3, the notches in the tongues 43 slip off the transverse pin 42 being no longer retained by the portion 49 and the ball is free to drop into the airstream with the vanes 22 disposed on the trailing side.

As the ball 18 falls clear of the escape opening 32 it is not drawn aft as rapidly as the closure 35 but drops clear due to its rounded shape and the lesser resistance which it addresses to the airstream. The transparent window 55 as shown in Fig. 4 is preferably provided in the outer shell portion 19 in a position in which the pilot may look through the same and when he determines that he has dropped a sufficient distance and is ready to bail out of the escape ball 18 he pulls upon the release ring 27 and the cables 28 which retract the rounded pins 21 upon which the shell portions are hinged and the portions are then free to separate or fall apart for the free fall of the pilot. The pilot may thereupon pull his rip cord for the operation of the attached parachute in the customary manner which it is not considered necessary to describe here in further detail.

The ball portions 19 and 20 are preferably installed in the airplane by insertion upwardly through the hatch opening 32. Suitable means may be provided for temporarily holding the ball in the operative flight position or it may preferably be held in place manually through the cockpit opening when the canopy 15 is removed and until the hatch door 35 and its ball-supporting elements 36 and 37 can be latched into place. A safety lock may also be provided to insure against inadvertent and undesired tripping of the lever 44. The pilot preferably climbs into and out of the cockpit in the conventional manner through the cockpit opening provided by the opened canopy 15 at such times when the aircraft is at rest upon the ground. While the escape ball is intended primarily for the escape from the aircraft while in flight at sufficiently high altitudes to permit use of a parachute, it may also be used as a protection for the pilot or other occupant of the aircraft at low altitudes just prior to or during a forced or crash landing under conditions in which it appears that the occupant may require its protection, in which case, of course, the parachute would not be used.

In certain installations it may be desirable to provide cable-actuated releasing gear at more than the front edge of the escape hatch closure 35 and it may also be desirable to forcibly eject the closure 35 by the use of compression springs, explosive means or other devices. It will also be understood that limit stops will be provided to limit the rotation of the outer shell portion 19 as it is closed about the inner portion 20 to prevent its re-opening again above the pilot's head and also that means may be provided to assist the pilot in separating the shell portions when he desires to free himself from the ball.

Other forms and modifications of the present invention which will occur to those skilled in the art after reading the above description, are intended to come within the scope and spirit of the present invention as more particularly set forth in the appended claims.

We claim:

1. In an emergency escape device for an aircraft a part-spherical shell element releasably supported within the aircraft, the interior of said shell element provided with a pneumatic cushion for the support of an occupant, means for deflating said pneumatic cushion in an emergency, a closure movably mounted upon said shell element for completing the spherical outline thereof as an emergency escape enclosure envelope about said occupant and means initiated by the closing movement of said closure for the release of said enclosure and its occupant from the aircraft.

2. In an aircraft, an emergency escape ball installation comprising a part-spherical shell portion, an escape hatch supporting said part-spherical portion, releasable latches supporting said escape hatch within the aircraft, a second part-spherical portion movably mounted upon said first shell portion arranged to be moved from a nested position with respect to said first shell portion to a position in which it encloses the pilot's body and completes the spherical enclosure thereabout, and release means cooperatively carried by the aircraft and said escape hatch automatically initiated by completion of said enclosure to trip said latches for the jettisoning of said escape hatch, said escape ball and the occupant therein.

3. An aircraft occupant escape means comprising a first hollow shell portion releasably supported upon the aircraft, a second hollow shell portion pivotally mounted upon said first shell portion arranged for rotation about said pivot from an open nested position in which the occupant may be seated within said first shell portion into a closed position in which it forms a completely enclosed escape compartment for said occupant and means initiated by movement of said second shell portion for the release of said escape compartment from the aircraft.

4. In an occupant means for aircraft, a hollow inner shell portion, a closure releasably supported upon the aircraft for the support of said inner shell portion, a hollow outer shell portion pivotally mounted upon said inner shell portion arranged for rotation about said pivot into a position in which it forms a completed escape compartment for said occupant and means operatively connected to said releasably supported closure actuated by rotation of said outer shell portion for releasing said closure and said escape compartment from the aircraft.

5. In an escape device for aircraft, a shell portion arranged to be occupied by an occupant seated within its interior, said shell portion releasably supported upon an aircraft, a cover portion for said shell portion pivotally mounted thereon arranged to be rotated to a closing position in which said occupant is completely protected within said shell portion and said cover portion, means operably associated with said shell portion initiated by rotation of said cover portion to said closing position for the automatic release of both said portions from the aircraft and manual means operable from within said shell portion for the separation of said portions by releasing the pivotal mounting between said portions.

6. In aircraft, an escape device comprising a shell member arranged to provide a seat for an occupant, releasable means for the support of said shell member from the aircraft, a cover for said shell member pivotally mounted on said shell member arranged to be rotated to a closing position in which said occupant is completely enclosed within an escape device complementarily formed by said shell member and said cover, and means cooperatively associated with said shell member, said cover and the aircraft initiated by rotation of said cover for releasing said escape device from the aircraft by the actuation of said releasable support means.

7. In an aircraft, an occupant escape means comprising a shell element releasably supported upon the aircraft, a second shell element movably mounted upon said first shell element arranged upon closing movement to provide a closure therefor, and means operatively associated with the first and second said shell elements and the aircraft initiated by the closing movement of said second shell element with respect to said first shell element for automatically releasing both said shell elements from the aircraft.

8. In an aircraft having a control column and rudder pedals, an occupant escape means comprising a hollow shell element releasably supported upon the aircraft, a second hollow shell element pivotally mounted upon said first shell element and pivotally movable with respect thereto to provide a closure therefor, means disposed within said first shell element to provide a bucket seat for said occupant from which to operate said control column and said rudder pedals, and trip means initiated by the closing movement of said second shell element with respect to said first shell element upon rotation about said pivotal mounting for automatically releasing said resulting shell element escape means from the aircraft.

9. In an aircraft, an occupant escape means comprising a shell element releasably supported upon the aircraft, a second shell element pivotally mounted upon said first shell element, cushion means carried within said first shell element to provide a seat and backrest for said occupant during flight of the aircraft, means carried internally within said second shell element for manually rotating the same for closing movement about said pivotal mounting into a complementarily closing position with respect to said first shell element, and tripping means initiated by said closing movement of said second shell element upon rotation about said pivotal mounting for automatically releasing said resulting shell elements from the aircraft.

10. In an aircraft, an emergency escape device including a shell element releasably supported within the aircraft, the interior of said shell element provided with a pneumatic cushion for the support of an occupant, means for deflating said pneumatic cushion in an emergency, a closure movably mounted upon said shell element for completing the shell outline thereof as an escape enclosure envelope about said occupant, and releasing mechanism arranged upon movement of said closure with respect to said shell element to automatically release said shell element from its support within the aircraft.

11. In an aircraft, a member, releasable means for the support of said member upon the aircraft, a closure element pivotally mounted upon said member for movement between a normally opened position with respect to said member and a closed position in which it supplements said member to provide a fully enclosed escape enclosure for an occupant of the aircraft, releasable pivot means providing the pivotal mounting of said closure element upon said member and means carried by said closure element arranged upon completion of the closing movement of said closure element with respect to said member to release said releasable support means for the release of said completed escape enclosure for its free fall from the aircraft and manual actuation of said releasable pivot means initiates separation of said closure element from said member for the escape of an occupant from said enclosure during its free fall from the aircraft.

12. In an aircraft, a seat member of substantially cup shape, releasable means for the support of said seat member upon the aircraft, a closure element pivotally mounted upon said seat member for manual movement between a normally opened position with respect to said seat member and a closed position in which it complementarily completes said seat member shape to provide a fully enclosed escape enclosure for an occupant of the aircraft, guide fins carried by said closure element, pivot means mounting said closure element upon said seat member whereby manual closing movement of said closure element with respect to said seat member causes tripping of said releasable support means for the automatic release of said completed escape enclosure for its free fall from the aircraft in which said guide fins direct said seat member toward the direction of free fall of said escape enclosure and manual actuation of said pivot means initiates separation of said closure element from said seat member for the escape of an occupant from said enclosure during its free fall from the aircraft.

13. In an aircraft escape arrangement, a cup-shaped seat member having a pneumatic inflated cushion arranged to provide a bucket type seat for an occupant, said seat member and inflated cushion arranged in such manner that when occupied only a small portion of the body of an occupant is contained within said cup-shaped seat member, releasable means for the support of said seat member upon the aircraft, a closure element pivotally mounted upon said seat member for manual movement between a normally opened position with respect to said seat member and a closed position in which it supplements said seat member to provide a fully enclosed escape enclosure for an occupant of the aircraft, means for deflating said pneumatic cushion, releasable pivot means mounting said closure element upon said seat member whereby deflation of said pneumatic cushion permits an occupant to fall back into said cup-shaped seat member such that substantially the entire body of the occupant is contained within said cup-shaped member and completion of the closing movement of said closure element with respect to said seat member provides a completed escape enclosure around the body of said occupant.

14. In an aircraft escape arrangement, an articulated escape closure including a seat shell element and a closure shell element, a releasable portion of the aircraft including an offset support surface for said seat shell element disposed beneath said seat shell element and forward of its center of gravity only, means including a detent cooperatively associated with the aircraft and a forward portion of said seat shell element for preventing rearward rocking of said seat shell element about said offset support surface, further means including a member engageable by said closure shell element upon closing of said enclosure for the release of said releasable aircraft portion and its offset support surface from its offset position beneath said seat shell element for imparting rearward and downward rotation to said seat shell element and its separation from said detent means and its release from the aircraft.

15. In an aircraft emergency escape arrangement, an articulated escape enclosure including a seat shell element having an opening and a closure shell element, a jettisonable portion of the aircraft arranged to provide an offset contacting support surface for said seat shell element forward of its center of gravity only, said seat shell element opening normally facing upwardly and forwardly, open hinge means cooperatively associated with the aircraft and a forward portion of said seat shell element for preventing rearward rotation of said seat shell element about its contacting support surface, manual means for closing said seat shell element opening with said closure shell element, further means for the release of said jettisonable aircraft portion from beneath said seat shell element for imparting rearward and downward rotation to said seat shell element and its separation from said open hinge means due to said offset support to a released position of said escape enclosure in which said seat shell element opening having been closed by said closure element and faces rearwardly and upwardly.

16. In aircraft, a pilot escape device including an inner rounded shell portion opening forwardly with respect to the aircraft arranged to be occupied by a pilot seated within the interior of said shell portion, a rounded cover for said inner shell portion pivotally mounted upon said inner shell portion on a horizontal transverse axis, a support for said inner shell portion carried by the aircraft, said cover arranged to be initially rotated manually upwardly and forwardly from a nested relationship with respect to said inner shell portion to a position at the upstream side of said device in which said occupant is completely enclosed within the rounded enclosure formed by said inner shell portion and said rounded cover, fins carried by said cover for stabilizing and guiding the free fall of said enclosure, and releasable means operatively engaging said support of said enclosure arranged in such manner that as said support and enclosure is released from the aircraft rotation is imparted thereto in the reverse direction of said initial rotation of said cover for bringing said fins toward the downstream side of said enclosure as the same falls freely from the aircraft.

17. An aircraft occupant escape means comprising a first hollow part-spherical shell portion releasably supported upon the aircraft, a second hollow part-spherical outer shell portion movably mounted upon said first shell portion arranged for movement from an open nested position with respect thereto in which the occupant may be seated within said first shell portion to a closed position in which it forms a completely enclosed escape compartment for said occupant and release means initiated by completion of said closing movement of said outer shell portion for automatically releasing said closed nested shell portions from the aircraft.

18. An escape means of the type called for by claim 17 characterised by the inclusion of manual means accessible to the occupant from within said first shell portion for moving said second shell portion into its closed position and initiating said automatic release.

References Cited in the file of this patent

UNITED STATES PATENTS

| | | |
|---|---|---|
| 1,281,846 | Salari | Oct. 15, 1918 |
| 1,626,796 | Drabenstott | May 3, 1927 |
| 1,635,823 | Di Giulio | July 12, 1927 |
| 1,798,137 | Beck | Mar. 31, 1931 |
| 1,820,958 | Zinkowetsky | Sept. 1, 1931 |
| 2,120,477 | Adams | June 14, 1938 |
| 2,457,252 | Martin | Dec. 28, 1948 |
| 2,536,086 | Pomykala | Jan. 2, 1951 |

FOREIGN PATENTS

| | | |
|---|---|---|
| 241,815 | Switzerland | Aug. 16, 1946 |
| 412,717 | Great Britain | Mar. 24, 1933 |
| 420,961 | France | Feb. 11, 1911 |
| 580,446 | Great Britain | Sept. 9, 1946 |

OTHER REFERENCES

Escape Capsule in Time Magazine, page 70, Nov. 1, 1948, 244–140.